United States Patent [19]

Ewing et al.

[11] Patent Number: 4,583,890
[45] Date of Patent: Apr. 22, 1986

[54] TAPER ADAPTER AND METHOD FOR MAKING SAME

[76] Inventors: Harry R. Ewing, Rte. 4, Box 31-A, Titusville, Pa. 16354; Craig R. Ewing, 4050 Ruskin Way Apt #3, Colorado Springs, Colo. 80910

[21] Appl. No.: 581,263

[22] Filed: Feb. 17, 1984

[51] Int. Cl.$^4$ .................................. B23B 29/04
[52] U.S. Cl. ...................... 408/239 A; 29/DIG. 1; 409/234
[58] Field of Search ............... 408/239, 239 A, 226; 409/232, 234; 279/1 A; 29/DIG. 1

[56] References Cited

U.S. PATENT DOCUMENTS 4,035,100  7/1977  Krüger et al. .................. 408/226
4,328,975  5/1982  Heguy et al. .................. 409/234 X Primary Examiner—Eugene F. Desmond
Attorney, Agent, or Firm—Charles L. Lovercheck; Wayne L. Lovercheck; Dale R. Lovercheck

[57] ABSTRACT

A taper adapter assembly is disclosed for attaching a boring bar or the like to a machine spindle. The adapter is made up of a tapered adapter member and a drive ring. The adapter member has a taper of the ordinary type with a bore in its small end to receive a draw bolt and a cylindrical portion on its large end which receives the drive ring and a cylindrical portion that extends out from the first mentioned cylindrical portion. The adapter is made up by inserting the tapered adapter member in the spindle of a machine, applying an adhesive to the enlarged cylindrical part of the taper adapter member and placing the drive ring over the cylindrical part and forcing the ring into place against the face of the spindle with a bonding clamp. The drive ring is thereby affixed to the taper adapter and the reduced size cylindrical portion inserted into a bore in the end of a tool holder. The flange of the taper adapter is bolted to the clamping ring. The tool holder (boring bar) is then bolted to the drive ring. Thus boring bars can be mounted on the machine with greater rigidity than with the conventional taper adapter and much less difficulty than flange mounted boring bars.

15 Claims, 10 Drawing Figures

TAPER ADAPTER AND METHOD FOR MAKING SAME

SUMMARY OF THE INVENTION

The present invention uses a conventional type of machine having a rotatable spindle with a taper bore to receive a taper adapter and an ordinary draw bolt for holding the taper adapter in place. This taper adapter is inserted and removed in the conventional manner. The novelty in the present invention is that the drive ring is cemented to the taper adapter while the drive ring is fixed in place against the face of the spindle nose. Therefore the drive ring can be located relative to the taper adapter while the drive ring rests against the face of the spindle. The taper adapter assembly can be removed from the spindle nose and a boring bar attached and the adapter replaced on the machine without disturbing the adjustment of the bar and the boring bar can be attached to the taper adapter assembly while the taper adapter assembly is separated from the spindle nose thereby making it possible to clamp larger size boring bars to the drive ring than would be possible with the previous types of boring bar assemblies. Ordinarily it is not desirable to use a greater ratio of length of a boring bar to its diameter than 6 to 1. By use of the adapter boring bars of greater length can be used without incurring chattering of the tool supported on the boring bar.

FIGS. 7 and 8 of the drawing show known types of taper adapters. The taper mounted boring bar shown in FIG. 7 lacks rigidity when handling large work since the bar is carried by the taper alone and vibrations and tool chatter results.

The flange mount boring bar shown in FIG. 8 is limited as to the diameter of the boring bars that can be used with it because the screws that hold the bar to the spindle must clear the body of the bar.

A drive ring could be provided made as an integral part of the taper adapter member but it would be difficult to machine accurately to fit machines of a variety of tolerances because of the multiplication of tolerances from the taper to the face of the spindle which must be controlled in order for the ring 12 to rest on the face of the spindle nose 11. Applicant has discovered that by making the drive ring or boring bar and taper adapter from two separate pieces and attaching them together on the particular machine on which they are to be used, the difficulty of manufacture to fit a variety of machines is eliminated.

OBJECTS OF THE INVENTION

It is an object of the invention to provide an improved taper adapter assembly.

Another object of the invention is to provide a taper adapter assembly which can be used to support larger size boring bars with the same size adapter than previous assemblies.

Another object of the invention is to provide an improved method of assembling a taper adapter.

Another object of the invention is to provide the rigidity of a flange mounted bar and the ease of loading and unloading of a standard taper adapter.

Another object is to provide rigidity of a flange mounted boring bar.

With the above and other objects in view, the present invention consists of the combination and arrangement of parts hereinafter more fully described, illustrated in the accompanying drawing and more particularly pointed out in the appended claims, it being understood that changes may be made in the form, size, proportions and minor details of construction without departing from the spirit or sacrificing any of the advantages of the invention.

GENERAL DESCRIPTION OF THE DRAWINGS

DETAILED DESCRIPTION OF THE DRAWINGS

Figure 1:
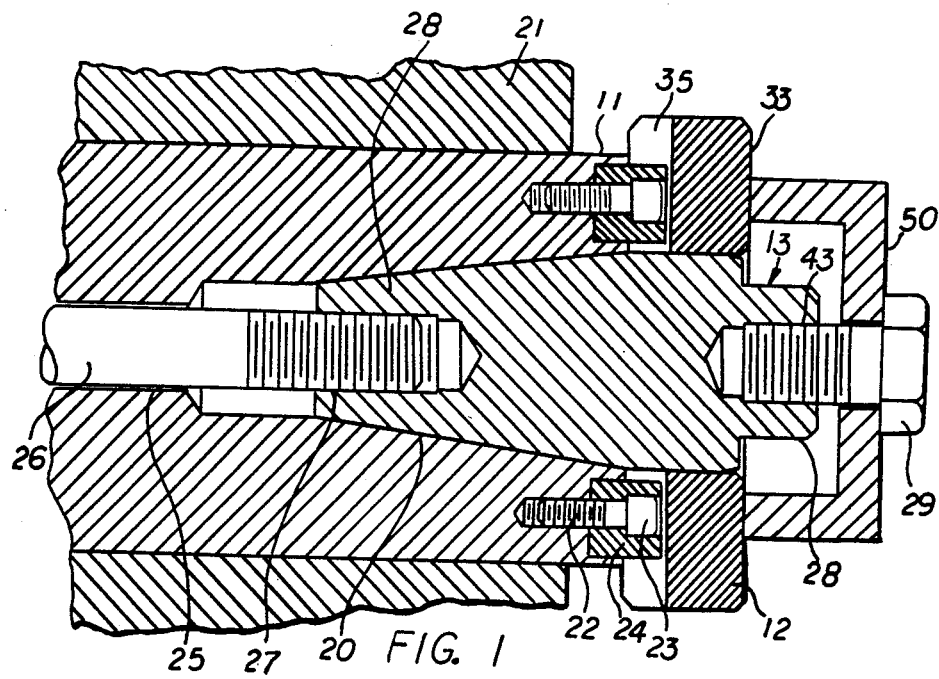
FIG. 1 is a longitudinal cross sectional view of the adapter assembly according to the invention with a bonding clamp in place.
Figures 2, 3:
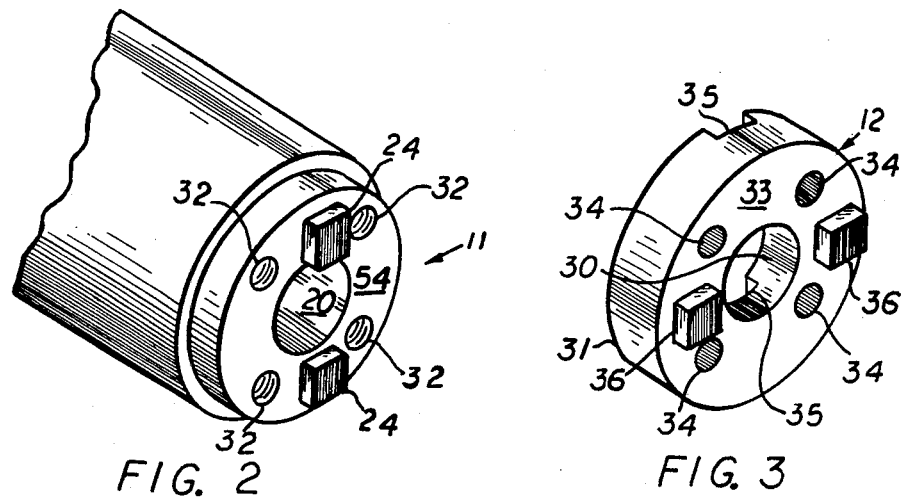
FIG. 2 is a front perspective view of the spindle nose.
FIG. 3 is a front perspective view of the drive ring.

Now with more particular reference to the drawing Applicant shows a taper adapter assembly made up of a spindle nose 11, taper adapter 13, drive ring 12 for use on a machine tool having a spindle nose 11 with a taper cavity 20 therein. The spindle nose 11 may be the type commonly found on any of the familiar machine tools where a boring bar, a quill or mandrel is attached to it wherein a female tapered spindle nose receives the taper adapter to support a tool to be rotated.

The spindle nose 11 shown has a tapered cavity 20 and is supported for rotation on rotatable bearings in the frame 21. The spindle nose has threaded bores 22 which receive the cap screws 23 which holds the drive keys 24 to the spindle nose. The keys 24 are fixed to spindle nose 11 and the keys 24 are received in slot 35 in the drive ring 12. The spindle nose 11 has a bore 25 which receives draw bolt 26. The draw bolt 26 threadably engages a threaded hole 27 in the taper adapter 13. The taper adapter member 13 has a cylindrical end 28 with threaded hole 43 receiving a screw 29 for holding the bonding clamp 50 in place during the assembly operation of the taper adapter and drive ring.

Figure 5:
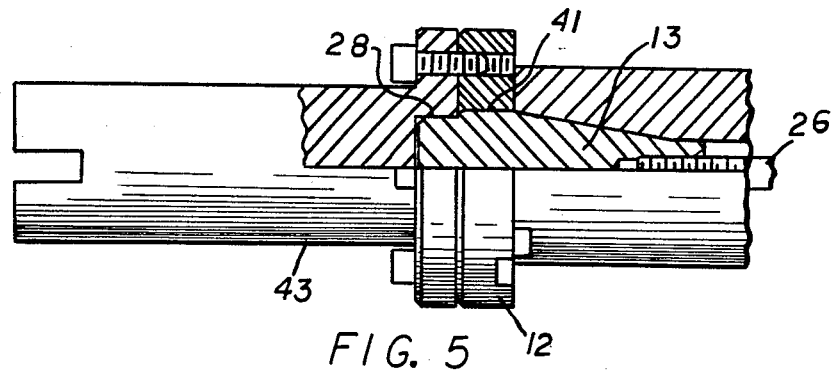
FIG. 5 is a view partly in section of a taper adapter and flange mount boring bar according to the invention.
Figure 6:
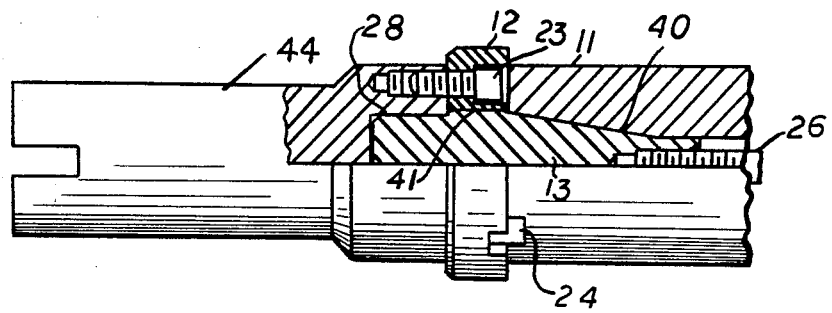
FIG. 6 is an assembly view partly in section of the taper adapter and boring bar.

The drive ring 12 is generally cylindrical in shape and has a cylindrical central bore 30 which is of about the same diameter as the diameter of the cylindrical part 41 of the taper adapter member 13. The bore 30 is concentric to the outer cylindrical surface 31 of the drive ring 12. Square keys 36 are supported on the drive ring 12 in a conventional manner, and keys 36 are diametrically spaced from one another on the face 33 of the drive ring. Circumferentially spaced holes 34 are formed in the adapter ring for receiving cap screws which extend into threaded bores 32 in the spindle nose 11 while the ring 12 is being assembled on the taper adapter 13 as an alternate assembly method when clamp 40 is not used. After the taper adapter 13 surface 41 has been bonded in bore 30 to hold the drive ring 12 in a position shown in FIG. 1 the taper adapter and drive ring with the bonding material between them are removed from the spindle nose 11, the bonding clamp 40 which has held the drive ring in position during bonding is removed and the taper adapter member and drive ring assembly may be bolted to a suitable boring bar as in FIG. 5 and FIG. 6 and the taper adapter and boring bar replaced on the machine with the keys 24 disposed in the slot 35 and the keys 36 on the drive ring 12 engaging suitable keyways on the boring bar as shown in FIGS. 5 and 6.

The taper adapter 13 shown in FIGS. 1 through 4 can be assembled in either of two ways:

1a. The taper adapter 13 is first placed in the spindle cavity 20 and seated by tightening the draw bolt 26.

b. Drive ring 12 is then placed over the end of the taper adapter 13 and bolted to the spindle nose 11 by means of screws inserted in holes 34 in the ring 12 threadably engaging holes 32 in the spindle nose. The surface 31 of the ring 12 are pulled into intimate contact with surface 54 of the spindle nose. Keys 24 on the spindle nose are at that time received in the keyways 35 of the ring.

c. The taper adapter member 13 is then removed from the cavity 20 and adhesive is applied to the cylindrical surface 41 and to the internal surface 30 of the ring.

d. The taper adapter is then put back into the spindle cavity 20 and drawn home with the draw bolt 26.

e. The adhesive is then allowed to at least partially cure and the taper adapter member 13 with the ring 12 adhered to it can then be removed from the spindle 11 and the adhesive allowed to continue to cure.

A suitable boring bar such as bar 44 shown in FIG. 6 can then be attached to the ring 12 with screws extending through holes 34 into threaded holes in a flange on the boring bar and the taper adapter replaced on the machine, the draw bolt 26 installed and the machine is then ready for operation.

As an alternate method of applying the ring 12 to the taper adapter member 13, steps a, b, c, d and e above can be carried out but instead of using screws in holes 34 and 32 to draw the ring 12 into engagement with the surface 54 of the spindle, the clamp 50 can be applied as shown in FIG. 1 by bringing the legs of the clamp into engagement with the face 33 of the ring 12 and forcing the ring 12 into engagement with the face 54 of the spindle 11 by means of screw 29 which engages the threaded hole 43 in the end 28 of the taper adapter member 13.

The operator may then bolt a boring bar 43, FIG. 5, or a boring bar 44, FIG. 6, to the taper adapter, reinsert the taper adapter in the spindle nose and put it in place with the draw bolt 26 and the machine is ready for operation.

Figure 7:
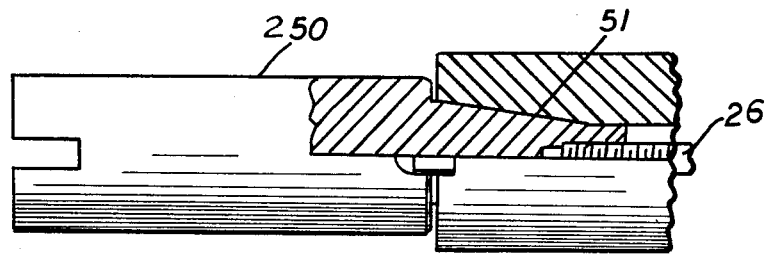
FIG. 7 is a view partly in cross section of a taper mount boring bar according to the prior art.

FIG. 7 shows boring bar 250 of a conventional type with integral taper adapter 51.

Figure 8:
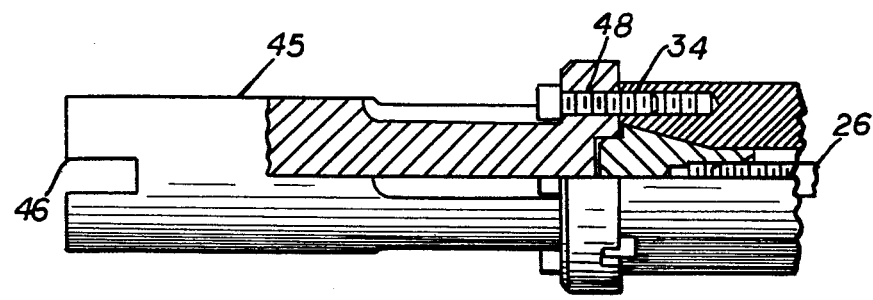
FIG. 8 is a view partly in cross section of a flange mount boring bar according to the prior art.

FIG. 8 shows a view of a flange mount boring bar 45 with boring block receiving groove 46 for a cutting tool. Screws 48 enter holes 34 in flange 49 of the boring bar 45. The taper adapter is held in place by draw bolt 26.

Prior art devices are shown in FIG. 7 and FIG. 8.

Figure 9:
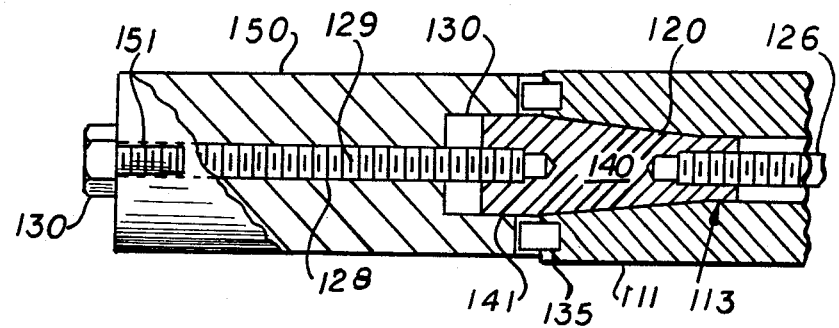
FIG. 9 is a longitudinal cross sectional view of another embodiment of the invention.
Figure 10:
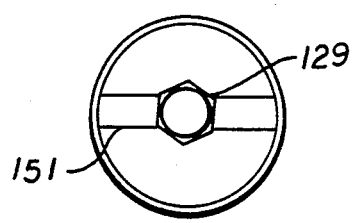
FIG. 10 is an end view of FIG. 9.

In the embodiment of the invention shown in FIG. 9 Applicant shows a machine having a spindle nose 111 with a cavity 120 therein. The taper cavity 120 receives the taper member 113 which has an external tapered surface 140 and which is pulled into place for example, by a draw bolt 26, any other suitable draw bolt available can be used, for example, a power operated draw bolt or the like.

Figure 4:
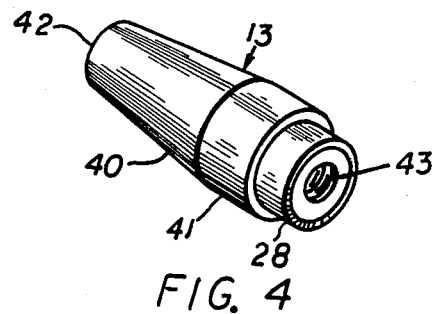
FIG. 4 is a side perspective view of the taper adapter member.

The taper adapter member 113 may be made in accordance with the taper adapter member 13 shown in FIG. 4 having the outer cylindrical surface 141 but without cylindrical surface 28 in FIG. 4.

The tool support which may be a boring bar such as the bar 250 shown in FIG. 7 has an inner cylindrical bore which receives the cylindrical end 141 on the taper adapter.

The bar 150 has a central hole, the bolt 129 which has a head 130. Keys 135 are attached to the spindle nose 111 and they are received in suitable keyways in the bar 150. A slot 151 is formed in the outer end of the bar 150 to receive a cutting tool.

An adhesive is placed on the cylindrical surface 141 inside the bore 130 and around the outer cylindrical surface 141 of the taper adapter.

To assemble the taper adapter shown in FIG. 9, the operator will first mount the adapter member 113 in the spindle nose 111 and hold it into place be means of a suitable draw bolt indicated at 126. The operator will then place adhesive over the outer cylindrical surface 141 of the taper adapter member 113 and inside the surface of the bore 130. He will then place the bar 150 over the end of the taper adapter member and pull the bar into intimate engagement with the outer end of the nose 111 and allow the adhesive on the surface 141 and 130 to partially set. He will then remove the bar 150 with the adapter member 113 attached to it from the machine and allow the adhesive to completely set. The bar is then ready to go back onto the machine for use.

The foregoing specification sets forth the invention in its preferred, practical forms but the structure shown is capable of modification within a range of equivalents without departing from the invention which is to be understood is broadly novel as is commensurate with the appended claims.

The embodiments of the invention in which an exclusive property or privilege is claimed are defined as follows:

1. In combination taper adapter for connecting a cutter supporting bar to a machine tool comprising said machine tool having a spindle nose,
   a drive ring,
   said taper adapter having a tapered end adapted to be received in a tapered hole in said machine tool spindle nose,
   a cylindrical surface on said taper adapter at one end thereof, said drive ring having a first side and a second side,
   key means on said first side of said drive ring adapted to cooperate with complementary key means on a boring bar,
   said drive ring having a central hole,
   said central hole receiving said cylindrical surface of said taper adapter,
   and means holding said taper adapter to said cylindrical surface of said drive ring,
   and circumferentially spaced holes in said adapter ring adapted to register with threaded holes in said spindle nose for mounting said drive ring on said spindle nose.

2. The combination recited in claim 1 wherein said second side of said drive ring has key ways for receiving keys on said spindle nose.

3. The combination recited in claim 1 wherein said means holding said taper adapter to said drive ring comprises an adhesive material.

4. The combination recited in claim 1 wherein said means holding said taper adapter to said drive ring comprises a weld.

5. The combination recited in claim 1 wherein a draw bolt is provided, said draw bolt extends through said spindle nose and thread means on said taper adapter engaging said draw bolt whereby said taper adapter is drawn into said spindle nose.

6. The combination recited in claim 5 wherein said draw bolt is released and said taper adapter removed before a boring bar is being attached to said drive ring.

7. The combination recited in claim 5 wherein said taper adapter and ring are removed from said spindle and a boring bar is attached to said adapter, said boring bar being rigidly attached to said drive ring.

8. In combination a taper adapter and a boring bar comprising,
a taper adapter member having a tapered part adapted to be received in a tapered cavity in a machine spindle nose,
said tapered part terminating in a first cylindrical part at its large end, a second cylindrical part attached to said first cylindrical part,
a drive ring,
said drive ring having a central cylindrical bore,
said cylindrical bore of said drive ring receiving said first cylindrical part of said taper adapter member,
said drive ring having circumferentially spaced holes,
said boring bar having a flange fixed to one end,
a central bore in said flange receiving said second cylindrical part of said taper adapter member,
circumferentially spaced holes in said boring bar flange and threaded members received in said holes in said boring bar flange and extending to said holes in said drive ring holding said boring bar to said drive ring,
and key means on said drive ring engaging first key means on said boring bar flange to restrain said boring bar to rotate with said drive ring.

9. The combination recited in claim 8 wherein said taper adapter member has an axially threaded hole in its end and remote from said cylindrical parts for receiving a draw bolt on a machine.

10. The combination recited in claim 8 wherein said threaded members holding said flange on said boring bar to said taper ring have heads on the ends adjacent said spindle nose.

11. The combination recited in claim 8 wherein said threaded members have heads received in counter bores in said drive ring adjacent said spindle nose.

12. A method of assembling a taper adapter on a tool support bar comprising,
providing a drive ring having a cylindrical hole, a first side and a second side and a taper adapter having a tapered end and a cylindrical end,
inserting said taper adapter cylindrical end into a tapered cavity in a spindle of a machine,
applying adhesive to said cylindrical hole in said drive ring,
applying adhesive to said cylindrical end of said taper adapter,
inserting said cylindrical end into said cylindrical hole,
drawing said drive ring into operative relation with said spindle,
and allowing said adhesive to cure.

13. The taper adapter method recited in claim 12 wherein said tool support bar has an axially disposed bore,
said tool support bar being forced into engagement with said spindle surface by means of a bolt extending through said axially disposed bore in said tool support bar and threadably engaging said taper adapter member.

14. The method recited in claim 12 wherein said drive ring is clamped to said spindle nose while said adhesive is curing.

15. A method of custom fitting a boring bar taper adapter for a machine tool having a rotatable member with a female taper cavity therein comprising:
providing a taper adapter having a tapered first end and a cylindrical second end,
providing a drive ring having a cylindrical central bore substantially the same diameter as said cylindrical end of said taper adapter,
placing said tapered end of said taper adapter into said female cavity and seating said taper adapter in said cavity,
placing adhesive on said cylindrical end of said taper adapter and placing said cylindrical end into said cylindrical bore of said drive ring,
allowing said adhesive to partially cure,
removing said said taper adapter with said ring adhered to it from said cylindrical member,
attaching a boring bar to said drive ring.

* * * * *